United States Patent
Huston et al.

(10) Patent No.: US 9,868,359 B2
(45) Date of Patent: Jan. 16, 2018

(54) VEHICLE COMMUNICATIONS, POWER MANAGEMENT, AND SEATING SYSTEMS

(71) Applicant: KLD Energy Technologies, Inc., Austin, TX (US)

(72) Inventors: Charles D. Huston, Austin, TX (US); Martyn T. Hunt, Pflugerville, TX (US)

(73) Assignee: KLD Energy Technologies, Inc., Austin, TX (US)

( * ) Notice: Subject to any disclaimer, the term of this patent is extended or adjusted under 35 U.S.C. 154(b) by 86 days.

(21) Appl. No.: 14/211,898

(22) Filed: Mar. 14, 2014

(65) Prior Publication Data

US 2014/0285146 A1 Sep. 25, 2014

Related U.S. Application Data

(60) Provisional application No. 61/788,759, filed on Mar. 15, 2013, provisional application No. 61/788,705, (Continued)

(51) Int. Cl.
*H02J 7/00* (2006.01)
*B60L 11/18* (2006.01)
(Continued)

(52) U.S. Cl.
CPC ......... *B60L 11/1816* (2013.01); *B60L 3/0046* (2013.01); *B60L 11/1838* (2013.01); *B60L 11/1846* (2013.01); *B60N 2/3015* (2013.01); *B60N 2/3047* (2013.01); *B60N 2/4802* (2013.01); *B60L 2250/00* (2013.01); *B60L 2270/40* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .............. B60L 11/1816; B60L 11/1838; B60L 11/1846; B60L 2240/70; B60L 2250/00; B60L 2270/40; B60L 3/0046; Y02T 10/7005; Y02T 10/7072; Y02T 90/14; Y02T 90/16; Y02T 90/169; Y02T 10/7055; Y02T 10/7291
See application file for complete search history.

(56) References Cited

U.S. PATENT DOCUMENTS

| | | | | |
|---|---|---|---|---|
| 7,191,053 | B2 * | 3/2007 | Dery | B60R 25/045 123/179.2 |
| 2013/0154561 | A1 * | 6/2013 | Gadh | H02J 7/0027 320/109 |
| 2013/0160086 | A1 * | 6/2013 | Katar | H04L 63/08 726/4 |

* cited by examiner

*Primary Examiner* — Vuthe Siek
(74) *Attorney, Agent, or Firm* — Husch Blackwell LLP

(57) ABSTRACT

A system for facilitating communication between a vehicle and a user includes a vehicle having a rechargeable battery and a communication and control subsystem. The communication and control subsystem is communicatively coupled to the battery to gather and transmit vehicle information, which may include battery information and a vehicle identifier. The system also includes a charging station having a charging station identifier and an electrical coupling between the charging station, a power source, and the vehicle. The electrical coupling is operable to charge the battery and includes a communicative coupling. The control subsystem is operable to receive communications from the user via the communicative coupling.

8 Claims, 9 Drawing Sheets

Related U.S. Application Data filed on Mar. 15, 2013, provisional application No. 61/788,631, filed on Mar. 15, 2013.

(51) Int. Cl.
    *B60L 3/00*     (2006.01)
    *B60N 2/48*     (2006.01)
    *B60N 2/30*     (2006.01)

VEHICLE COMMUNICATIONS, POWER MANAGEMENT, AND SEATING SYSTEMS

CROSS REFERENCE TO RELATED APPLICATIONS

This application claims priority from the following U.S. Provisional Patent Applications: 61/788,759 filed on Mar. 15, 2013, entitled SYSTEM AND METHODS FOR COMMUNICATING WITH AN ELECTRIC VEHICLE; 61/788,705 filed on Mar. 15, 2013 entitled SYSTEM AND METHODS FOR SHARING POWER BETWEEN AN ELECTRIC VEHICLE AND A WHEELCHAIR; and 61/788,631 filed on Mar. 15, 2013 entitled COMPACT VEHICLE WITH INTEGRATED SEATING AND RELATED SYSTEMS AND METHODS, the entire teachings of which are incorporated herein by reference.

TECHNICAL FIELD

The present disclosure generally relates to (i) systems for use by an operator of an electric vehicle to facilitate communication between the operator and the vehicle; (ii) systems for use by a vehicle operator or passenger who is in a wheelchair or similar transportation device that uses a chargeable battery to operate; and (iii) compact cars and neighborhood vehicles for use by an operator or passenger who is in a wheelchair or similar transportation device.

DESCRIPTION OF THE RELATED ART

Powered electric wheelchairs offer users with impaired mobility a level of independence they might not otherwise have. Users of such devices are sometimes highly reliant on their wheelchairs for even basic transportation and may not be able to transport themselves without the assistance of the wheelchair. It is very important to such users that the wheelchair does not lose power, as such an outage could leave them stranded and vulnerable while they are in the middle of transport from one location to another.

Users of such electric wheelchairs may also operate other electric vehicles.

One example of such an electric vehicle, a neighborhood electric vehicle (an NEV) is undergoing continuous development, and models continue be developed into smaller and more refined vehicles. More compact designs associated with such refinement may result in vehicles being less safe to operate, especially where those components included in the vehicle may protrude into the interior of the car. Components that protrude into the vehicle may, either during normal operation or in the event of an accident, come into contact with the body of a user, which may be undesirable in some circumstances.

BRIEF DESCRIPTION OF THE DRAWINGS

Illustrative embodiments are described in detail below with reference to the attached drawing figures, which are incorporated by reference herein and wherein.

Figure 1:
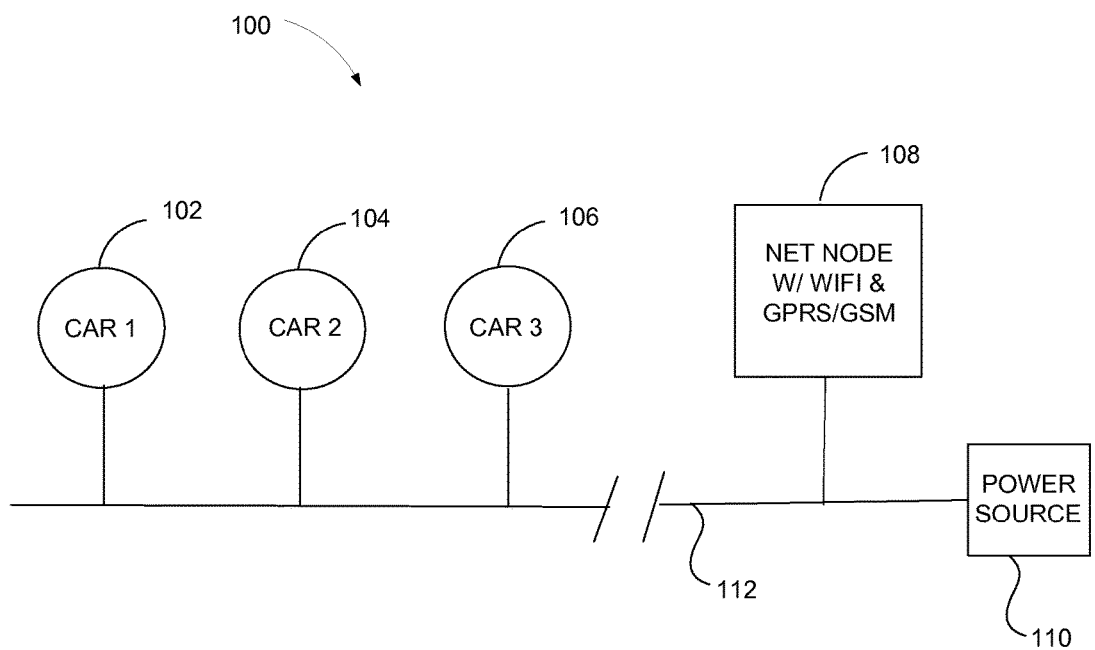
FIG. 1 is a schematic diagram showing a network of a plurality of electric vehicles, a net node with WI-FI or another wireless protocol, and a power source.

The illustrated figures are only exemplary and are not intended to assert or imply any limitation with regard to the environment, architecture, design, or process in which different embodiments may be implemented.

DETAILED DESCRIPTION

In the following detailed description of the illustrative, non-limiting embodiments, reference is made to the accompanying drawings that form a part hereof. These illustrative embodiments are described in sufficient detail to enable those skilled in the art to practice the invention. It is understood that other embodiments may be utilized and that logical, structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion and, thus, should be interpreted to mean "including, but not limited to." Unless otherwise indicated, as used throughout this document, "or" does not require mutual exclusivity.

According to a first illustrative embodiment, a system for facilitating communication between a vehicle and a user includes a vehicle having a rechargeable battery. The system also includes a communication and control subsystem communicatively coupled to the battery to gather and transmit vehicle information. Such vehicle information includes, for example, battery information and a vehicle identifier that corresponds to and identifies the vehicle. The vehicle identifier may be, for example, a Media access control (MAC) address, or similar identifier. The system also includes a charging station having charging station identification information and an electrical coupling between the charging station, a power source, and the vehicle. The charging station may also function as a or include a communications base station that coordinates communications by and between the vehicle, charging station, and users of the system. The electrical coupling between the charging station, a power source, and the vehicle is operable to charge the battery using power received from the charging station. The electrical coupling between the power source and the rechargeable battery includes a communicative coupling. The communications and control subsystem is operable to transmit communications to a user from the vehicle and receive communications from the user to the vehicle via the communicative coupling.

In an embodiment, the charging station is connected to the internet or another communications network such as a wireless communications network. A user of the system may communicate with the control subsystem using a computing device, and the user may transmit a command to the control subsystem to operate the vehicle using the computing device. Such a command may be, for example, an instruction to start the vehicle motor or an instruction to start a vehicle climate control system. Alternatively, the command may be an instruction to transmit vehicle data to a recipient. The transmitted vehicle data may be, for example, data that indicates the amount of energy stored by the rechargeable battery of the vehicle or the health of a vehicle subsystem.

The electrical coupling described above may be any suitable communication schema and may be, for example, Power Line Communication Protocol, Power Line Carrier (PLC) communication protocol, Power Line Digital Subscriber Line (PDSL) communication protocol, mains communication, Power Line Telecom (PLT), Power Line Networking (PLN), or Broadband over Power Lines (BPL). Data transmitted using the selected communication protocol may include charging station identification information, as noted above, which may indicate location information that corresponds to the location of the charging station at which the vehicle is located.

With conventional internal combustion engine ("ICE") vehicles, such as automobiles, communication with the vehicle when not in use is not often critical to the driver being able to use the car. Electric vehicles, however, differ in many respects. For example, a major difference between ICE vehicles and electric vehicles is that when the electric vehicle is plugged in, power usage is not much of a concern. When the EV is not plugged in and the vehicle is moving, however, power usage is a major concern because the vehicle operator could be temporarily stranded if the vehicle loses power. Even if a charging station is nearby, it may be time consuming to charge the vehicle's battery, whereas a user of an ICE vehicle can quickly stop at a gas station and refuel.

The systems and methods described herein relate, in part, to a user communicating with their EV when it is plugged in (on external power) for a variety of purposes. The EV may be plugged into a power source, such as, for example, a 110 v, 220 v, single or 3 phase electrical outlet along with one or more additional EVs. Each EV could be equipped with WI-FI, GPRS or another transceiver type to facilitate radio-based communication. There are, however, a number of problems with radio-based systems that communicate vehicle data. For example, to communicate by radio, the EV would need to be within radio communication range of a base station, user, or other receiver. Such proximity may be difficult to obtain when not charging at a base station or in the presence of excessive interference. Radio systems may also add a layer of complexity and cost to a vehicle.

This disclosure recognizes that the consumer wants to communicate with the EV primarily when it is plugged into a conventional power source. If plugged in, there are several "out of band" communication schemas that can use the power conduits for communication. There are several types of communication schemas using power transmission lines that are suitable for transmitting vehicle communication when plugged in. Such communication schemas include power line communication or Power Line Carrier (PLC), also known as Power Line Digital Subscriber Line (PDSL), mains communication, Power Line Telecom (PLT), Power Line Networking (PLN), or Broadband over Power Lines (BPL) which, as noted previously, are systems for carrying data on a conductor also used for electric power transmission. See U.S. Pat. Nos. 6,608,552; 6,278,357; 6,674,806; 6,619,532; and 5,614,811, which are herein incorporated by reference.

In an embodiment, a user uses their cell phone or another suitable computing device as a user interface to communicate with a base station coupled to or embedded in one or more stations. Each such charging station may have one or more EVs plugged into it, each having a transient and/or permanent unique identifier such as an IP address and/or MAC address. In an embodiment, each charging station may be coupled to one or more EVs, ten or more EVs, or one hundred or more EVs.

Unique identifiers such as MAC addresses or other suitable identifiers may be assigned to individual vehicles in a manner similar to a vehicle identification number (VIN), and each such identifier may be referred to herein as a vehicle identifier. Similarly, station identifiers may be used to track communications with a charging station. The vehicle identifiers may be acknowledged and used to determine the identity of one or more vehicles that are in communication with the charging station. Both the vehicle identifier and the station identifier may be tracked and analyzed to respond to user queries.

Once communication between a vehicle and a charging station is established, the vehicle identifiers may be queried to identify vehicles that are communicating with each charging station. A similar query may also be executed by querying the station identifier to identify vehicles that are coupled to the charging station. The charging station can then provide information over the internet or an extended network to users regarding the vehicles that are communicatively coupled to the base station.

The vehicle identifier, which may be a MAC assignment as noted previously, allows the base-station to assign IP addresses through a dynamic host configuration protocol (DHCP) and use network address translation (NAT), in conjunction, to separate the local addresses from external addresses. This system may create a more secure environment where the base-station can filter and grant permissions to public client requests to prevent unauthorized users from communicating with a vehicle.

An example system that provides for the communications and networking capabilities described above is shown in FIG. 1. According to the embodiment shown in the diagram of FIG. 1, such a system 100 includes a first vehicle 102, a second vehicle 104, and a third vehicle 106. The first vehicle 102, second vehicle 104, and third vehicle 106 are electrically coupled to an electrical coupling (and communicative) 112, which may be any suitable coupling, as described above. The electrical coupling 112 couples the first vehicle 102, second vehicle 104, and third vehicle 106 to a power source 110 associated with a charging station 108. As noted above, the charging station 108 includes a communications base station that functions as a net node and is operable to communicate with a network via any suitable communications protocol, such as WI-FI, GPRS/GSM, or a wired network connection.

In an embodiment, when an EV plugs into a charging station 108, it registers with the resident base station. The network then knows where the EV is located (much like a cell tower). When the user wants to communicate with the EV, the user simply inputs the command and is informed if the EV is connected and if the EV received the command via the communications interface.

Figure 2:
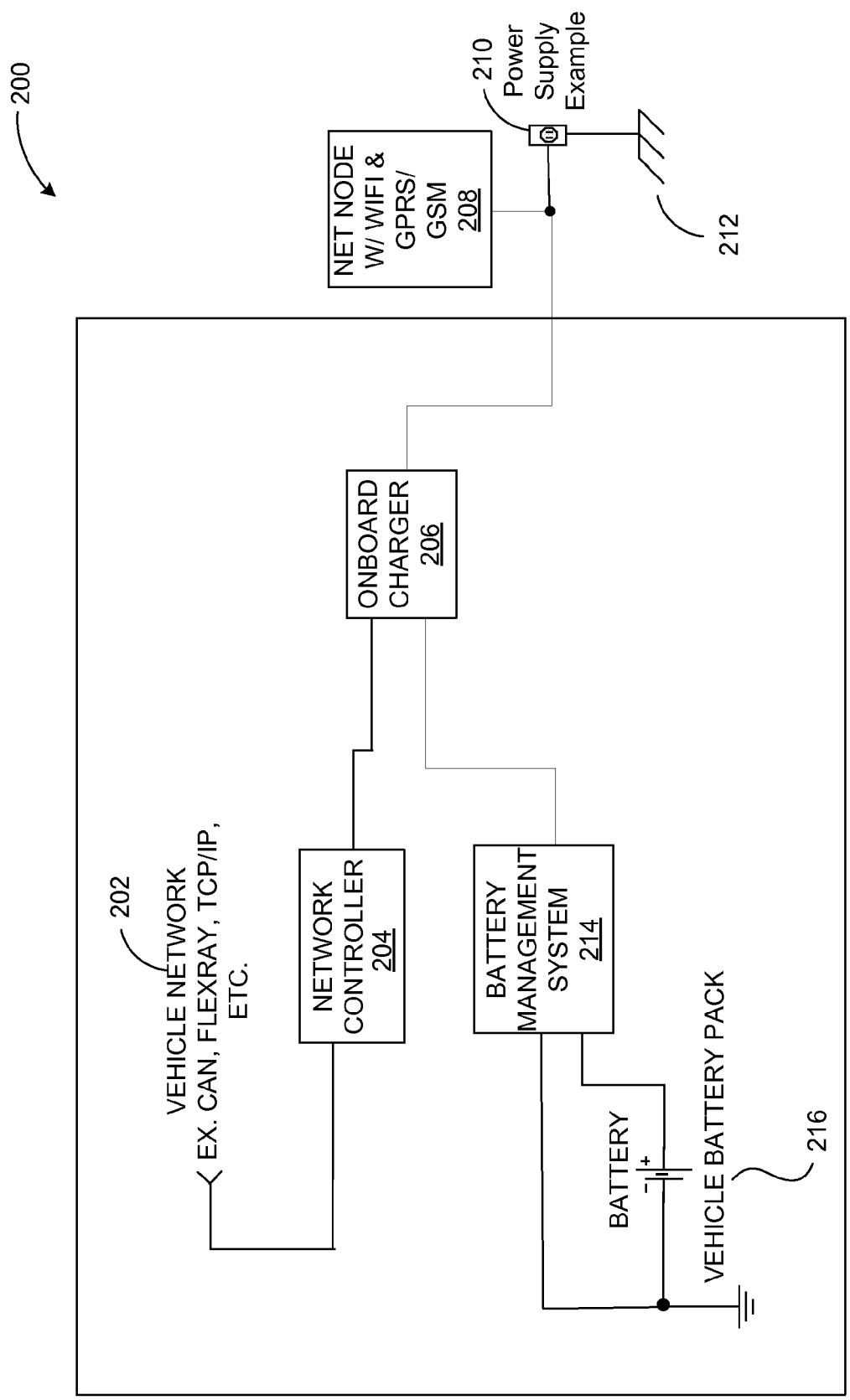
FIG. 2 is a diagram of an illustrative vehicle communication subsystem that includes an onboard charger connected to a power conduit.

In an embodiment, a cloud network or mainframe is deployed to support base-station and vehicle updates and upgrades, such as firmware updates, software upgrades, and alerts that include useful information relating to the vehicle, such as Technical Service Bulletins. Hardware onboard the EV translates communication messages between the in-vehicle network protocol and the communication protocol occurring over the power conduit. As shown in the diagram of FIG. 2, a vehicle 200, which is analogous to any of the first vehicle 102, second vehicle 104, and third vehicle 106 described above with regard to FIG. 1, includes an onboard charger 206 for interfacing with the electrical coupling of a charging station. The onboard charger 206 provides power to a battery management system 214 that manages vehicle power and charges a battery pack 216 of the vehicle 200. The onboard charger 206 is also coupled to a network controller 204 that communicates with the various systems of the vehicle 200, which are illustrated in the diagram as a vehicle network 202. The vehicle network 202 may include, for example, a controller area network (CAN), Flexray, time-triggered protocol (TTP), TCP/IP, or another suitable communication system or bus that facilitates communication between the vehicle's microcontrollers and other devices within the vehicle 200. The selected communication system is suitable for use in automotive or electric vehicle applications and may be a message-based protocol. As considered herein, the vehicle network 202 includes one or more of the vehicle's systems, and may include an engine controller and powertrain controller, as well as interfaces for gathering data related to the vehicle's airbags, braking system, cruise control, power steering system, audio systems, windows, doors, mirrors, battery 216 and battery management system 214.

User commands may be issued to, for example, pre-warm or pre-cool a vehicle. In addition, a user may issue commands to allow access to manage, change or initiate a charging schedule. Information such as state of charge or maintenance status can be accessed through the communication interface, which may be accessed via the charging station 208. Where appropriate, aspects of any of the embodiments described above may be combined with aspects of any of the other embodiments described to form further examples having comparable or different properties and addressing the same or different problems.

Figure 3:
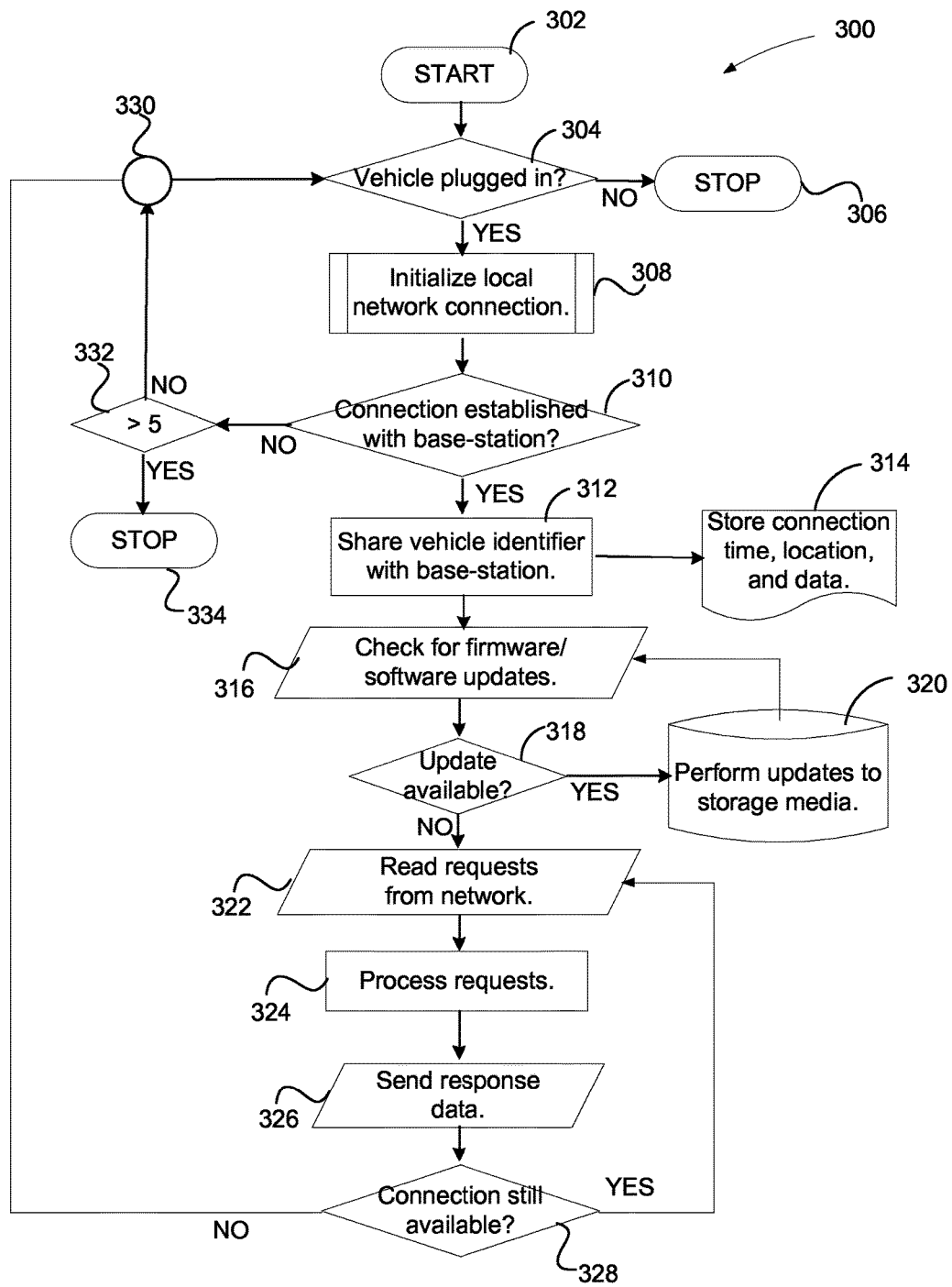
FIG. 3 is a flow chart showing a process for communicating with an electric vehicle by connecting the vehicle to a network.

FIG. 3 shows a representative process 300 for updating a vehicle's software or firmware and responding to a user request using an electrical coupling between a vehicle and a charging station. The process may start 302 at any time. For example, the process may start 302 on a regular or scheduled time interval, any time the vehicle is coupled to the charging stating, upon user initiation, or at any other suitable time. After startup, the system determines whether the vehicle is plugged in to the charging station 304. If the vehicle is not plugged in, the process stops 306. If the vehicle is plugged in, the local network connection is initialized 308. Further, the process determines whether there is a connection to the base station 310, which may involve a handshake process or other affirmation that the vehicle is communicatively coupled to the base station via the electrical coupling. If no connection is established, the process may retry the validation process up to five times 332 (or any other predetermined amount of times) before stopping the process 334. If the connection is established, then the vehicle identifier (e.g., a MAC address) is shared with the base station 312 and the base station stores connection time, location data, and other applicable vehicle data 314. The process also involves a query to determine whether there have been software or firmware updates 316 by comparing the most recent versions of software and firmware stored in the vehicle to the most recent versions available over the network 318. If an update is available, then the system performs updates to the applicable software or firmware 320. If no update is needed, the vehicle reads requests, such as the types of user requests noted above, from the network 322, processes the requests 324, and sends response data to a user 326 to, for example, confirm that the request was performed. In an embodiment, after processing the request, the vehicle determines whether the charging station connection remains available 328 and continuously reads and responds to new requests while the connection remains active.

Figure 4A:
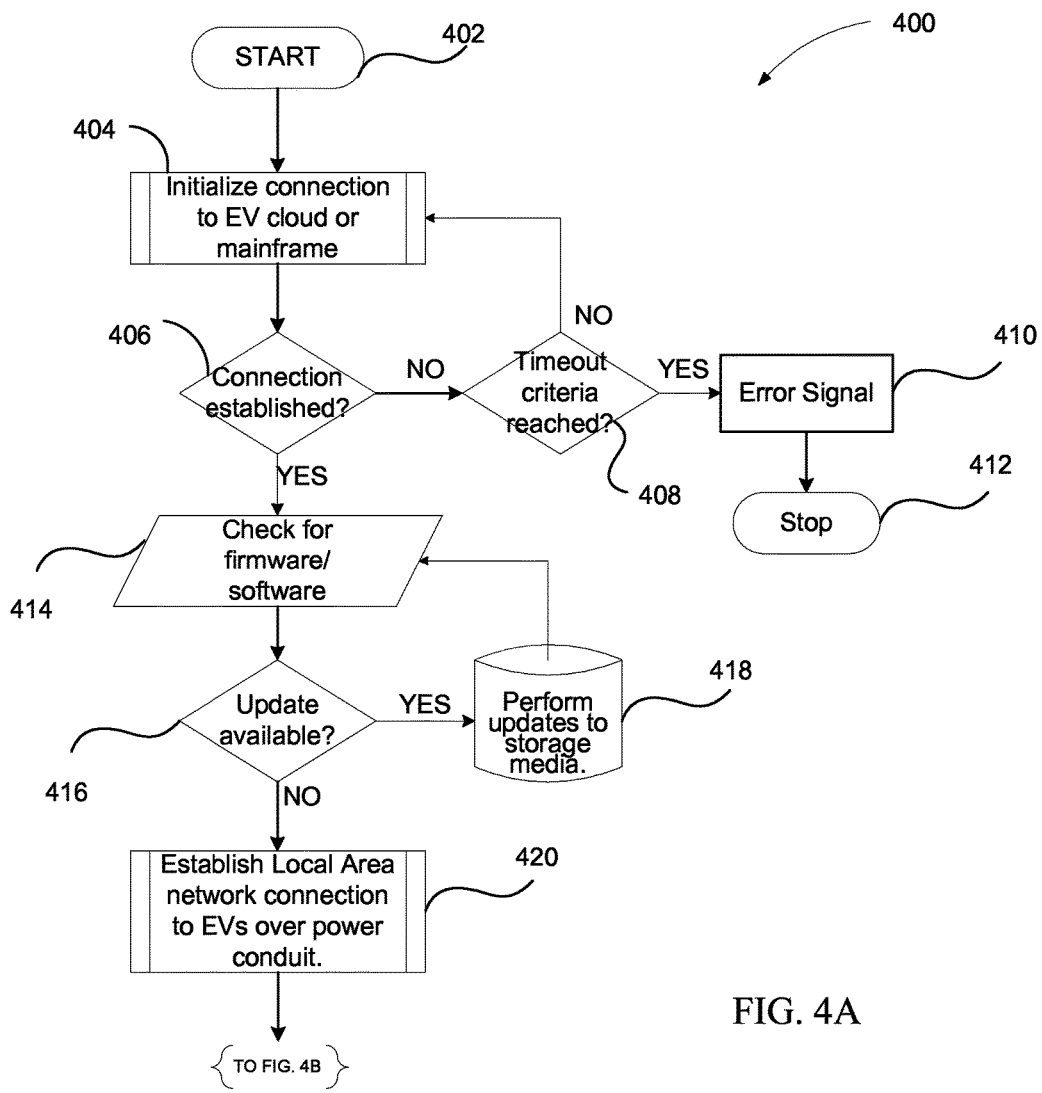
FIGS. 4A-4B are flow charts showing a process for communicating with an electric vehicle using a base-station that networks electric vehicles and a cloud or mainframe.
Figure 4B:
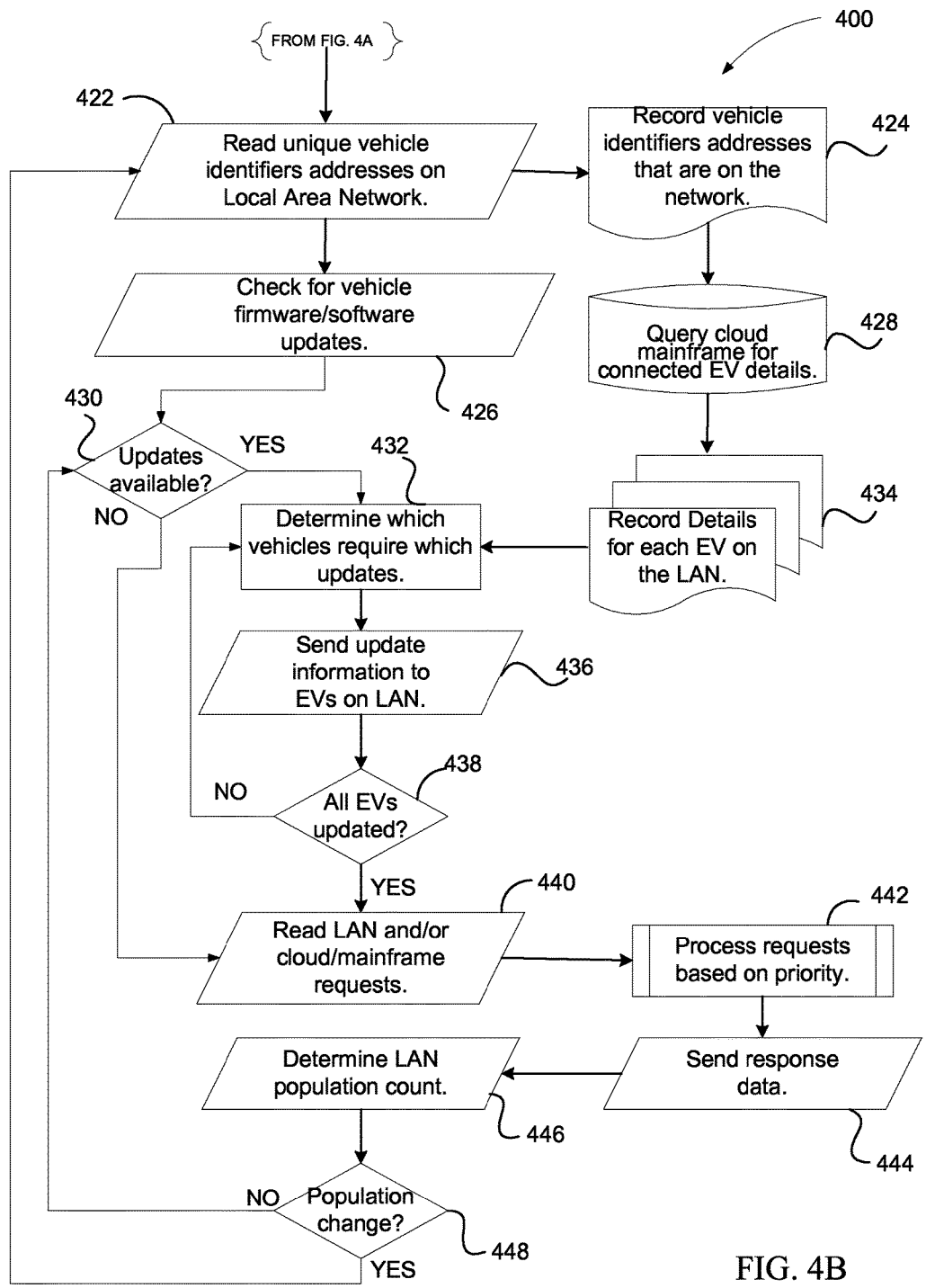

FIGS. 4A-4B show a representative process 400 for updating vehicles' software or firmware and responding to user requests using electrical couplings between vehicles and charging stations in a system that includes a plurality of vehicles. Like the process 300, the process 400 may start 402 at any time. For example, the process may start. 402 on a regular or scheduled time interval, any time a vehicle is coupled to the charging stating, upon user initiation, or at any other suitable time. Here, a charging station initializes a connection to a cloud (an "EV cloud") or mainframe computer that determines operation of the charging station 404 and determines whether the connection has been successfully established 406. These steps are repeated until a connection has been established unless the charging station determines that timeout criteria are met 408, in which case the station generates an error signal 410 to a user or system operator and stops 412.

After a connection is established, the station checks its firmware and software versions 414 and determines whether an update is available 416. If updates are available, the updates are downloaded to local storage media and applied to the station 418. If no additional updates are available, the station establishes a local area connection to the connected vehicles 420 over the electrical coupling or power conduit. Next, the station reads the vehicle identifiers for the vehicles that are available on the local area network 422, or connected to the base station, and records the vehicle identifiers that are part of the base station's network 424. The base station also queries the EV cloud or mainframe for operating details of the connected vehicles 428 (for example, from a manufacturer's or user's database) and records the details of each vehicle to the local area network 434. The details may include software and firmware information and updates for the vehicles that are present.

As noted, the process 400 includes the base station determining whether software or firmware updates are available 430, determining which vehicles require which updates 432, and sending the update information to the applicable vehicles using the local area network 436. The base station determines whether all vehicles on the network are updated 438 and the update process repeats until all vehicles are updated. Following the update process, or if no updates are available, the process includes reading requests for the vehicles over the local network or via the EV cloud 440 and processing the read requests on a priority basis 442 in which requests are prioritized based on importance or the order in which they are received. Response data is then sent to confirm that the request was received and/or performed 444. The base station may then continue to monitor the population count of vehicles on its network 446. If there has been a change in the population of vehicles on the network, then the process returns to the step of reading the vehicle identifier information 442 so that any new vehicles may be updated if necessary. If there is no change in the population of the network, then the process may involve continuously determining whether updates or new requests are received to ensure that the resident vehicles are updated and have responded to user requests.

Figure 5:
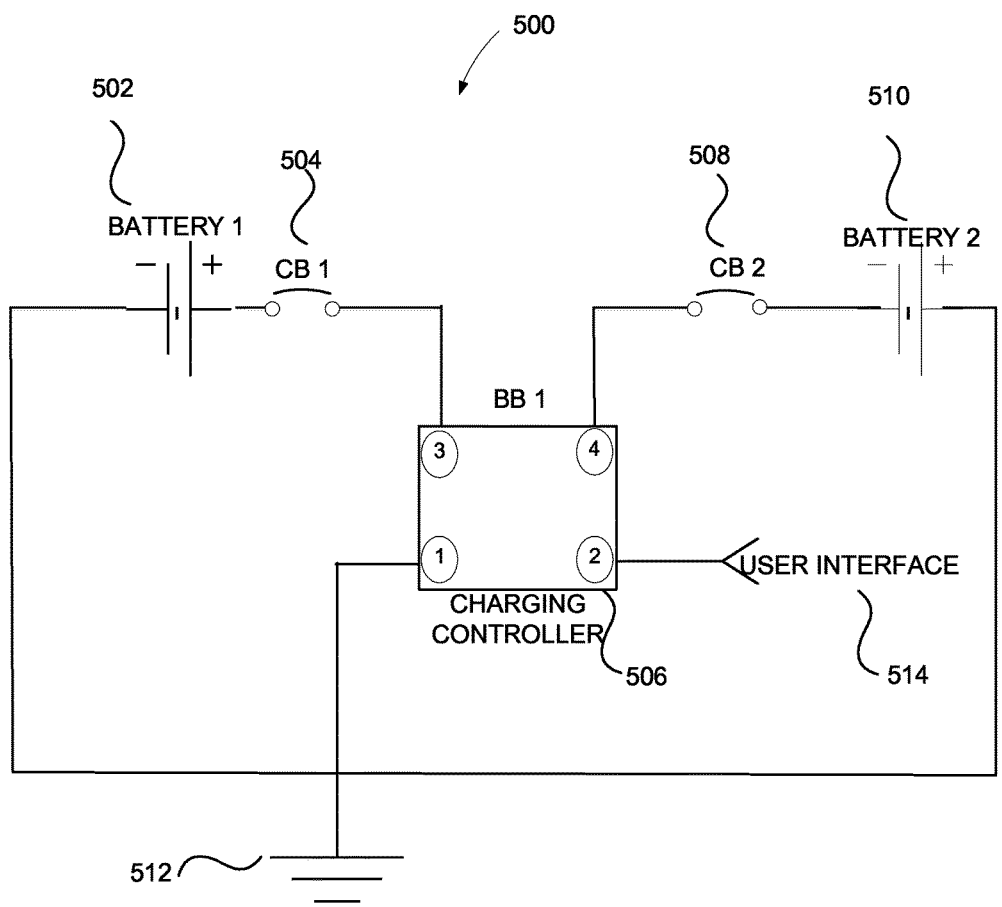
FIG. 5 is a diagram of a system for using a vehicle battery to charge a user's wheelchair battery.

In a related system 500, the vehicle may include a charging controller 506 that uses the vehicle's battery to charge a battery of a user's electrically powered wheelchair or similar transportation device. As shown schematically in FIG. 5, in an embodiment, such a system includes a user interface 514, which may be any of the user interfaces described above or a vehicle-mounted use interface. The user interface 514 is communicatively coupled to a charging controller 506 having a first charging bridge 504 that couples to the wheelchair (or similar transportation device) battery 502 and a second charging bridge 508 that couples to the vehicle's battery pack 510.

The system 500 may be implemented in a vehicle, which may be an EV or any other type of vehicle, that transports an electric wheelchair. As referenced herein, an electric wheelchair is understood to be any type of powered mobility device, including without limitation an electric wheelchair or scooter that a person may use for transportation outside of the vehicle. The illustrative system 500 provides the capability to share power between the wheelchair battery pack 502 and vehicle battery pack 510. For example, if a wheelchair battery 502 is at 50% charge and the vehicle battery 510 is at 100% charge, the user may charge the wheelchair battery 502 while in transit to a destination, such as a meeting or event. In the event of a brief commute during which such a charging occurs, the battery charges may have balanced out somewhat so that the vehicle battery 510 is at a 90% charge and the wheelchair battery 502 is at 70% charge after the brief commute during which the charging occurs, thereby increasing the range of the wheelchair following the commute.

In an embodiment, the user of the vehicle may also use power from the wheelchair battery 502 to provide supplemental power to the vehicle battery 510. For example, the user may be one mile from his or her destination but about to lose all vehicle power due to a dead vehicle battery 510. In such an embodiment, the user may supplement the vehicle battery 510 with stored electrical power from the wheelchair battery 502 to get to the destination or to a roadside assistance location. Such an event would be rare, given that the vehicle battery 510 is likely to have a much higher capacity (on the order of, for example, around 15 MWh), than the wheelchair battery 502 (which may have a capacity of, for example, less than 1 MWh). None the less, such a capability may help to reduce costs and provide greater safety to users in the event of an emergency. In such an embodiment, a visual user interface may be included so that a user can monitor the charge levels on each of the batteries 502, 510 and select the amount of power they wish to transfer to the wheelchair battery from the vehicle battery, or vice versa.

In an embodiment, the charging controller 506 limits the discharge of vehicle battery power to the wheelchair battery 502 to maintain a power reserve in the vehicle battery 510 and reduce the chance of a user body standard. Therefore, in an embodiment, the charging controller 506 prevents deep discharge of the vehicle battery 510, which may result in damage to certain types of batteries. In an embodiment, a battery management system of the vehicle can incorporate automatic power sharing based on a variety of factors, i.e. driving style, location, battery health, etc. In addition, the charging controller 506 and related charging systems may include a voltage conversion system having, for example, a transformer to enable power to be distributed from one battery to the other at a charging voltage that is optimized for the battery receiving power.

In some embodiments, a control system that is integral to the battery management system allows a user to input data relating to their transportation habits to optimize the distribution of battery power between the vehicle battery 510 and wheelchair battery 502. For example, a user may input data to the control system to indicate (1) the length of their trip or average commute (to indicate, for example, that their commute is 15-30 minutes long) (2) that their destination has a charging station, or (3) whether they desire to transfer reserve power to their wheelchair battery 502 so that and the end of the trip, most of the remaining power will be allocated to the wheelchair battery 502. By transferring expected excess vehicle battery power to the wheelchair battery 502 during transit, wheelchair battery 502 may be as fully charged as possible when the user reaches the destination. Such an arrangement may be efficient for the user because he or she may then maximize use of the wheelchair battery 502 after parking their vehicle at a location where the vehicle battery 510 can be replenished without inconvenience to the user. In such an embodiment, a GPS or other location system coupled to the vehicle may indicate that the vehicle is within a certain distance of a charging station or a power outlet at the user's destination, reserve adequate power to reach the destination or charging station, and divert all remaining power to the wheelchair battery 502. Other systems and methods that relate to the interaction of such a vehicle with a GPS system are described in provisional patent application No. 61/930,299 filed Jan. 22, 2014, entitled AUTOMATED NAVIGATION AND CONFIGURATION SYSTEMS AND METHODS FOR LIMITED-ACCESS VEHICLES, the disclosure of which is hereby incorporated by reference.

In another embodiment, the system may be used to charge any auxiliary battery based on user input. For example, a user may divert reserve power to a laptop battery or a battery for any suitable portable device so that they can maximize their aggregated charging time when they replenish the power of their vehicle battery 510.

Figure 6:
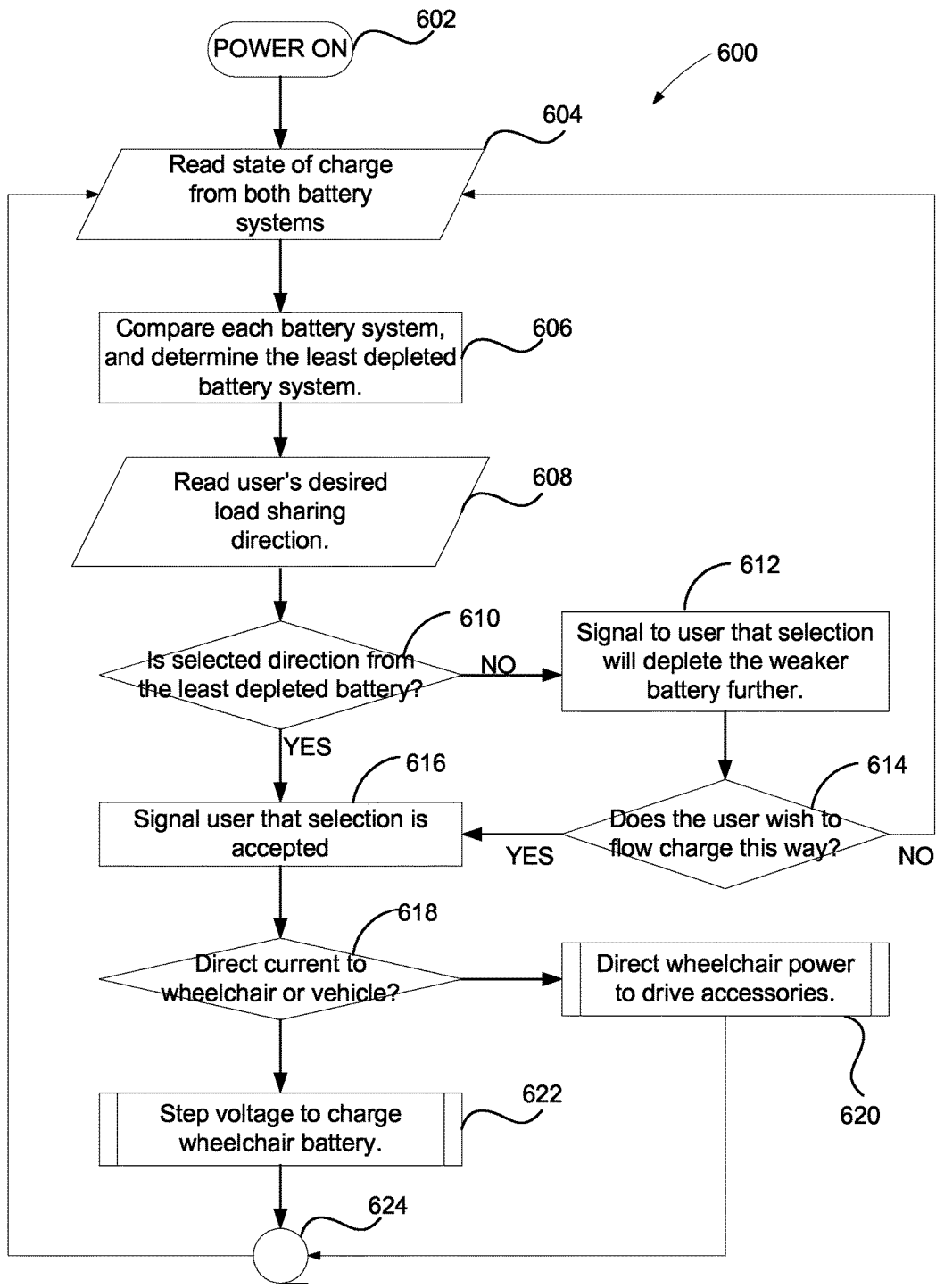
FIG. 6 is a flow chart showing a process for sharing power between a vehicle and wheelchair in accordance with the system of, for example, FIG. 5.
Figure 7:
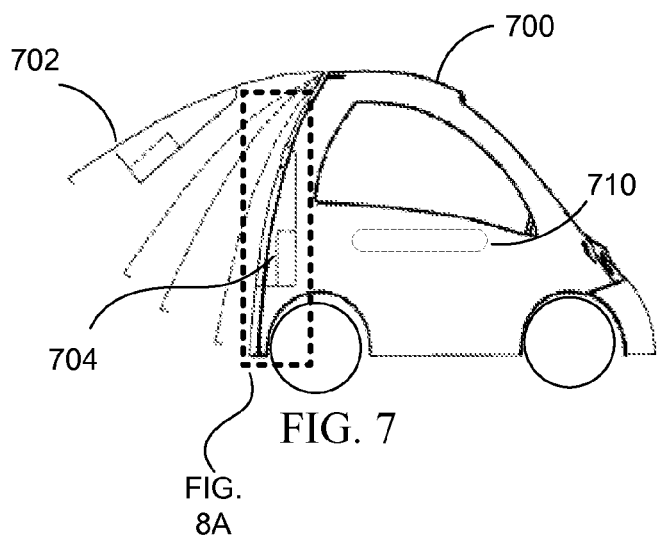
FIG. 7 illustrates a side view of a compact vehicle having a hatchback style rear door transitioning from the open position to a closed position.

An example process 600 for implementing such a system is shown in the flowchart of FIG. 6. The process 600 starts when the vehicle is powered on 602. The charge controller next reads the state of charge from both battery systems 604. The process may also include comparing each battery system and determining the least depleted battery system 606. In addition, the process includes reading the user's desired load sharing direction 608, which may be any of the directions described above relating to the diversion of charge from one of the batteries to the other. The process also includes making a determination as to whether the selected direction of charge (for example, from the vehicle battery to the wheelchair or other auxiliary battery) is from the least depleted battery (the battery having more power) 610.

If the direction of charge is from the battery having more power to the battery having less power, a signal may be generated to indicate to the user that the selection is accepted 616. If, however, the direction of charge is from the battery having less power to the battery having more power, then an alternative signal or alarm may be generated to indicate to the user that the weaker battery will be further depleted if the charge direction is executed 612. The user may then decide whether to continue the charge 614 and the process will continue and indicate that the selection is accepted 616 if the user so desires. The charge controller then determines whether the charge instruction involves directing current to the wheelchair (or auxiliary) battery or to the vehicle battery 618. If the charge is to be directed to the vehicle battery, the voltage may be stepped up to direct battery power from the wheelchair battery to the vehicle battery 620. Alternatively, if the charge is to be directed to the wheelchair battery, the voltage may be stepped down to direct battery power from the vehicle battery to the wheelchair battery at a suitable charge voltage 622.

It is further noted that in any of the foregoing embodiments, the user will generally prefer for the interior the vehicle to be safe. Thus, as shown in FIGS. 7-9D, the shell or frame of the vehicle may be used as part of the vehicle's interior seating to economize manufacturing costs of the vehicle while also improving safety.

According to an illustrative embodiment, a compact vehicle 700, such as a neighborhood electric vehicle, has a single opening hatchback door 702, which is used as the back of one or more seats 704. That is, when the hatchback door 702 closes, the seat 704 or a similar support structure such as a seat back, is positioned behind the user to provide support, not only for comfort, but for crash worthiness and safety. The seat back might include a headrest or restraints, such as latches, a seatbelt, tie-down anchors, or other suitable features for restraining or supporting the body of a user within the interior of the vehicle 700. The restraints may be pre-positioned in the back of the vehicle 700, or configured to be easily repositioned by a user (on sides or spring-aided hinges, for example). In an illustrative embodiment, the restraints are positioned exactly where the user needs them, thereby facilitating use of the restraints during safe operation of the vehicle. For example, in an embodiment, the restraints may be positioned based on the user's needs and their expected position within the vehicle 700, and may include any of the supports or restraints noted above. Further, in an illustrative embodiment, the hatchback door 702 may form a structural element of the vehicle, such as a beam or frame member to add rigidity and strength to the body of the vehicle 700. In an embodiment in which the hatchback door 702 functions as a structural element of the vehicle, a seat back or restraint may be secure and crash worthy by virtue of its formation within the frame of the vehicle 700.

It is noted that the integral restraint and seating elements, such as a seatback or folding seat 704 and integrated seatbelt are not confined to hatchback configurations or to back rests. For example, a hatchback door 702 may incorporate a seat back with a releasable seat element, such as a seat 704 that easily detaches from the hatchback door 702 when the operator of the vehicle does not expect to use the seat 704. This makes entry to and exit from the vehicle 700 easier for a user that will not use the seat, and decreases the likelihood of unwanted contact with the body of the user in the event of an accident. In another illustrative embodiment, the side of the vehicle 700 might include a releasable, removable, or foldable seat 704 that can be easily stowed. These features allow for greater safety, but additionally more efficient use of interior space and ease of loading.

Figure 8A:
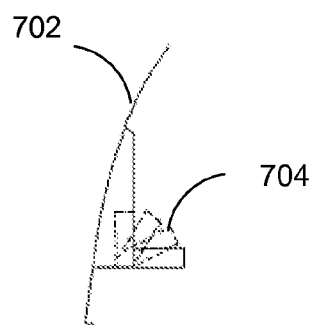
FIGS. 8A and 8B are alternative, detail views of a portion of the hatchback style rear door of FIG. 7 in which a seat element is deployed to support the body of a user.
Figure 8B:
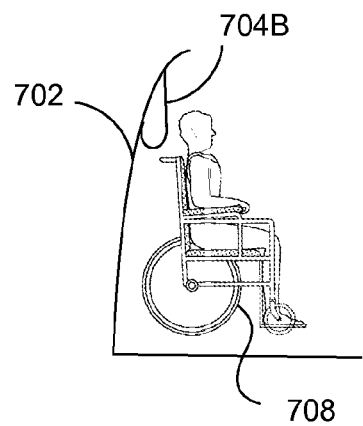
Figures 9A, 9B, 9C:
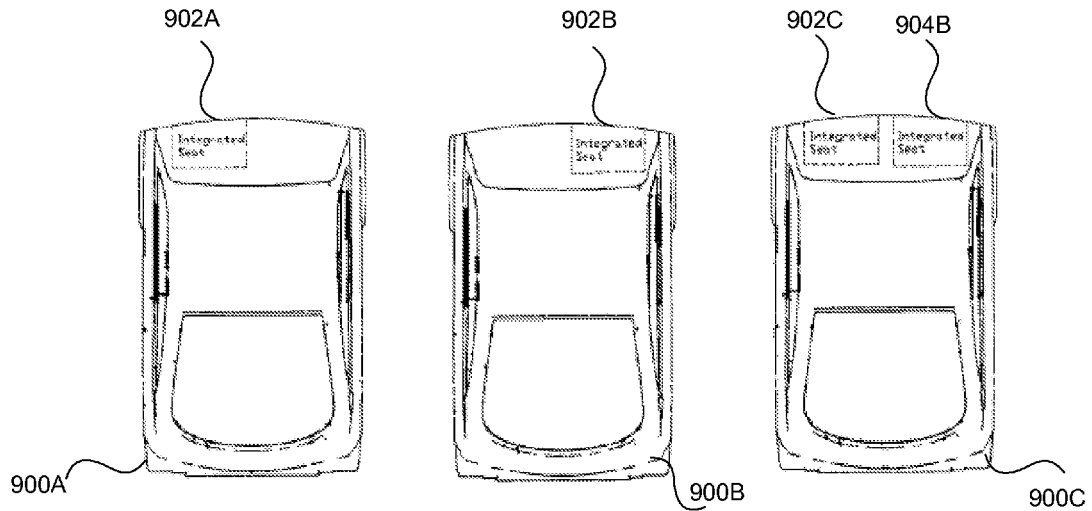
FIGS. 9A-9D show schematic, top views of a portion of a vehicle having different integrated seating configurations.
Figure 9D:
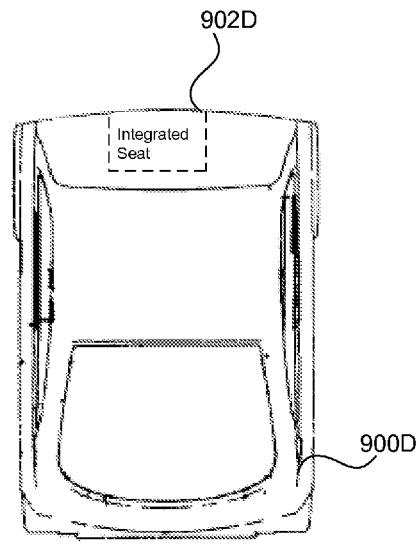

According to an illustrative embodiment, a vehicle 700 may be a NEV for operation by a person with a disability who uses a wheelchair. Depending on the type of wheelchair the operator uses, the integrated seat element 704 may include one or more elements of a traditional car seat, such as a rigid frame that is anchored to the frame of the vehicle 700, a seatbelt, an adjustable or fixed seatback, a headrest or neck support, and arm rests. Portions of the integrated seat may be selected and configured to mate with or complement the operator's wheelchair. For example, as shown in FIG. 8B, where an operator's wheelchair 708 includes all of the needed support with the exception of a headrest, the integrated seating element 704B may comprise only a headrest that rotates into place behind the operator's head as the hatchback door 702 closes. A seatback may be similarly configured to complement a wheelchair that supports the operator's back, but to a lesser degree than a normal car seat, and may deploy in substantially the same fashion as described above with regard to the headrest. Extendable seatbelt members may also be integrated into the hatchback door 702 or another extendible portion of the vehicle 700 so that the point where the operator initially grasps the belt and the point where the operator latches the belt may be more easily accessed by an operator having a limited range of motion.

According to another embodiment, a hinged component may be included in a door 702 of the vehicle 700 and configured to engage the operator's wheelchair and rotate into place (partially) around or over the body of the user so that the user may only have to extend a seatbelt a small distance, as compared to a seatbelt in a normal automobile, to secure his or her self in the vehicle.

In a similar manner, arm rests or other supports 710 intended to support the sides of the operator's body may be formed integrally to the body of the vehicle 700 on either side of the vehicle body and at the expected location of the user. In an embodiment, the side supports 710 may extend to provide comfortable and functional support to the body of the user while the user is in the vehicle 700. For example, where an operator lacks upper body strength, side supports 710 may extend on either side of the user when the hatchback door 702 closes or from the hatchback door 702, the sides of the vehicle 700, the floor of the vehicle 702, or even the ceiling of the vehicle 702 to assist the user in maintaining his body in an upright position that provides better visibility, comfort, and control over the vehicle 702.

In another embodiment, a folding seat 704 may be included in a hatchback door 702 of a vehicle 700 that is intended to be primarily, but not always, operated by a user who is in a wheelchair. In such an embodiment, the cab of the vehicle 700 may general be empty so that an operator can maneuver his or her wheelchair into the cab of the vehicle 700 and operate the vehicle 700 from the wheelchair. However, when the operator leaves and a second operator desires to operate the vehicle who is not in a wheelchair, the second operator may rely on the integrated seating, such as a fold down seat 704 of any of the types described above, to provide a seating surface he or she may use when operating the vehicle 700. In such an embodiment, the fold down seat 704 may include seatback that is coupled to a folding seat bottom by a hinge. The seat back may include an indented portion that corresponds to the profile of the seat bottom so that when folded up, the seat bottom does not protrude beyond the seat back. As such, the seat bottom may be sized and configured to fit within the indented portion of the seat back.

According to another illustrative embodiment, the cab of the vehicle 700 may be wide enough to seat multiple passengers and one or more integrated seating elements may be used to allow for (1) a driver who is not in a wheelchair and a passenger who is in a wheelchair, (2) a driver who is not in a wheelchair and a passenger who is in a wheelchair, (3) a driver and a passenger who are not in wheelchairs, and (4) a driver and a passenger who are in wheelchairs. Such configurations are shown in FIGS. 9A-9D, in which (a) an integrated seat 902A is placed at the front left portion of the vehicle 900A, (b) an integrated seat 902B is placed at the front right portion of the vehicle 900B, (c) integrated seats 902C, 904C are is placed at the front left portion of the vehicle 900C and at the front right portion of the vehicle 900C, respectively, and (d) an integrated or removable seat 902D is placed at the front center portion of the vehicle 900D.

Where appropriate, aspects of any of the embodiments described above may be combined with aspects of any of the other embodiments described to form further examples having comparable or different properties and addressing the same or different problems.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

What is claimed:

1. A system for facilitating communication between a vehicle and a user, the system comprising:
a vehicle having a rechargeable battery and a communication and control subsystem communicatively coupled to the battery to gather and transmit vehicle information, wherein the vehicle information comprises battery information and a vehicle identifier;
a charging station, wherein the charging station comprises a charging station identifier;
an electrical coupling between the charging station, a power source, and the vehicle, the electrical coupling being operable to charge the battery; and
a computer device for utilizing the vehicle identifier and the station identifier to identify and locate a particular vehicle;
wherein the electrical coupling between the power source and the rechargeable battery comprises a communicative coupling; and wherein the control subsystem is operable to receive communications from the user and transmit a command to the vehicle for control of the vehicle via the communicative coupling.

2. The system of claim 1, wherein the control subsystem is operable to transmit communications to the user via the communicative coupling.

3. The system of claim 1, wherein the base station is connected to one of the Internet and a wireless communications network, and wherein the vehicle identifier comprises a MAC address.

4. The system of claim 1, wherein the control subsystem is operable to receive a command from a computing device of the user.

5. The system of claim 4, wherein the command comprises an instruction to transmit vehicle data to a recipient.

6. The system of claim 5, wherein the vehicle data comprises data that indicates the amount of energy stored by the rechargeable battery.

7. The system of claim 1, wherein the electrical coupling comprises a communication schema selected from the group comprising power line communication, power line carrier (PLC), Power line Digital Subscriber Line (PDSL), mains communication, power line telecom (PLT), power line networking (PLN), and Broadband over Power Lines (BPL).

8. The system of claim 1, wherein the charging station identifier comprises location information.

* * * * *